(12) United States Patent
Kim et al.

(10) Patent No.: US 7,577,971 B2
(45) Date of Patent: Aug. 18, 2009

(54) DATA STRUCTURE AND SIGNALING METHOD FOR EMERGENCY ALERT MESSAGE AND DIGITAL TV RECEIVER

(75) Inventors: Bong Seok Kim, Seoul (KR); Chang Sik Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 627 days.

(21) Appl. No.: 11/177,293

(22) Filed: Jul. 11, 2005

(65) Prior Publication Data
US 2006/0015898 A1 Jan. 19, 2006

(51) Int. Cl.
*H04N 7/025* (2006.01)
(52) U.S. Cl. .......................................... 725/33; 725/32
(58) Field of Classification Search ................... 725/33, 725/86, 32
See application file for complete search history.

(56) References Cited

U.S. PATENT DOCUMENTS 5,495,283 A * 2/1996 Cowe ........................... 725/33
5,657,414 A * 8/1997 Lett et al. ...................... 386/35
7,159,230 B2 * 1/2007 Manson et al. ................. 725/33
2002/0197968 A1 * 12/2002 Yamanishi ................... 455/142
2005/0015799 A1 * 1/2005 Park .............................. 725/32
2005/0229206 A1 * 10/2005 Pugel et al. .................... 725/33

* cited by examiner

*Primary Examiner*—Brian T Pendleton
*Assistant Examiner*—Jean D Saint Cyr
(74) *Attorney, Agent, or Firm*—McKenna Long & Aldridge, LLP

(57) ABSTRACT

An emergency alert message is included in a cable broadcast signal. The emergency alert message includes major and minor details channel numbers associated with a details channel. A details channel number is configured based on the major details channel number when the minor details channel number is set to a null value. Next, it is tuned to a channel frequency of a digital cable channel corresponding to the details channel number when the details channel number exists in a digital channel number list. Alternatively, the emergency alert message includes a details channel source field which indicates whether a details channel is a digital or an analog channel. Then, it is tuned to a channel frequency of one of a digital cable channel and an analog cable channel based upon a value of the details channel source field.

11 Claims, 5 Drawing Sheets

• EAM:Emergency Alert Message

FIG. 2

| Syntax | Bits | Description |
|---|---|---|
| alert_priority | 4 | uimsbf |
| details_OOB_source_ID | 16 | uimsbf |
| reserved | 6 | '111111' |
| details_major_channel_number | 10 | uimsbf |
| reserved | 6 | '111111' |
| details_minor_channel_number | 10 | uimsbf |
| audio_OOB_source_ID | 16 | uimsbf |

• EAM:Emergency Alert Message

FIG. 4

| Syntax | Bits | Description |
|---|---|---|
| alert_priority | 4 | uimsbf |
| details_OOB_source_id | 16 | uimsbf |
| details_channel_source | 2 | uimsbf |
| reserved | 4 | '111111' |
| details_major_channel_number | 10 | uimsbf |
| reserved | 6 | '111111' |
| details_minor_channel_number | 10 | uimsbf |
| audio_OOB_source_ID | 16 | uimsbf |

DATA STRUCTURE AND SIGNALING METHOD FOR EMERGENCY ALERT MESSAGE AND DIGITAL TV RECEIVER

This application claims the benefit of the Patent Korean Application No. 10-2004-0055119, filed on Jul. 15, 2004, which is hereby incorporated by reference.

BACKGROUND OF THE INVENTION

1. Field of the Invention

The present invention relates to a data structure and signaling method for an emergency alert message and a digital TV receiver, in which the emergency alert message is transmitted as an in-band signal from a digital cable broadcast transmitter.

2. Discussion of the Related Art

Generally, a cable set-top box is needed to receive digital cable broadcasts. The digital cable set-top box, which is connected to a cable headend (a sort of a broadcasting station) sending digital cable programs, receives an A/V broadcast program via in-band of a cable frequency band and data broadcasts via out-of-band (OOB). Specifically, the cable set-top box makes bi-directional communications with the headend via OOB.

There are broadcasting protocols such as SI (service information) and PSIP (program and system information protocol) for transmitting channel and broadcast programs guide information. To secure stability in cable broadcasting, the SI is transmitted via OOB (i.e., as an out-of-band signal) and the PSIP information is transmitted via in-band (i.e., as an in-band signal). And, as digital cable broadcast receivers, there are U.S. Open Cable, European DVB-C, Japanese ISDB-C and the like.

The open cable broadcast receiver is a system that separates a POD (point of deployment) module including a conditional access (CA) system from a body of a digital cable set-top box for the copy prevention and conditional access to valuable broadcast contents. Thus, the open cable broadcast receiver provides an easy replacement function of a security system and enables a retail sale, whereby low-price digital cable broadcast receivers can be supplied. The POD module uses a PCMCIA card to be loaded in a slot of the digital cable set-top box for instance. Hence, the POD module is occasionally called a cable card. And, the POD module and the cable card will be used without distinction in the following description.

Meanwhile, there is a cable-ready digital TV capable of receiving cable broadcasting without a cable set-top box to enable a retail sale that the open cable system pursues. Namely, the cable-ready digital TV has a built-in cable set-top box to receive terrestrial analog broadcasting, terrestrial digital broadcasting, cable analog broadcasting and cable digital broadcasting without a separate cable set-top box, thereby enabling a user to view all kinds of the broadcasts.

A receiver capable of receiving cable broadcasting, e.g., a cable-ready digital TV has a basic protocol of receiving to process an emergency alert message transmitted from a transmitting side to prepare for an emergency situation. Namely, the cable-ready digital TV receives an emergency alert message transmitted via a specific frequency of a terrestrial wave or cable, makes a channel change into a specific channel of the terrestrial wave or cable to effectively provide information of an emergency alert to a user currently watching the TV, and then outputs the information of the emergency alert. After the emergency alert situation has ended, the specific channel should be changed into the previous channel the user previously watched. Hence, such complicated situations are regulated as the basic protocol of the cable-ready digital TV.

The emergency alert message can be transmitted via OOB or in-band. The cable-ready digital TV receives the emergency alert message transmitted via OOB if the POD module is loaded or the emergency alert message transmitted via in-band if the POD module is not loaded. A specific channel of the emergency alert message transmitted via in-band corresponds to a two-part channel number consisting of a channel pair (e.g., 100-3) having a major channel number (i.e., physical channel number) and a minor channel number (i.e., a program number).

Meanwhile, an analog cable channel has no minor channel. In other words, the major channel number of an analog cable channel is the channel number of a particular physical channel and its minor channel number is set to a null value which represents a predetermined value (e.g., a value of 0) indicating that there is no minor channel. The channel numbering of an analog cable channel is similar to that of an analog terrestrial channel which has a minor channel number set to 0. In addition, when the minor channel number of a digital cable channel is set to a null value, its channel number simply becomes a one-part channel number including its major channel number only.

Therefore, if an emergency alert message is received via in-band since the POD module is not loaded, a minor channel number of a details channel included in the emergency alert message can have a null value.

Thus, the conventional emergency alert message signaling method is unable to clearly identify whether the details channel to be tuned is the analog channel or the digital channel represented by the one-part channel number in case that the minor channel number is set to a null value. So, the tuning to the details channel may be not performed properly.

SUMMARY OF THE INVENTION

Accordingly, the present invention is directed to a data structure and signaling method for an emergency alert message and digital TV receiver that substantially obviate one or more problems due to limitations and disadvantages of the related art.

An object of the present invention is to provide a data structure and signaling method for an emergency alert message and digital TV receiver, by which it can be clearly identified whether a details channel included in an emergency alert message transmitted as an in-band signal is an analog channel or a digital channel.

Another object of the present invention is to provide a data structure and signaling method for an emergency alert message and digital TV receiver, in which a transmitting side adds channel species information to an emergency alert message to transmit and by which it can be clearly identified whether a details channel included in the emergency alert message transmitted as an in-band signal is an analog channel or a digital channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an emergency alert signaling method for use by a cable TV system includes the steps of (a) determining whether a minor details channel number included in an emergency alert message is set to a null value, the emergency alert message being included in a cable signal, (b) configuring a first details channel number based on a major details channel number included in the emergency alert message when the minor details channel number is set to the null value, (c) determining whether the first details channel number exists in a digital channel number list including channel numbers of a list of viewable digital channels, and (d) tuning to a channel frequency of a digital cable channel corresponding to the first details channel number when the first details channel number exists in the digital channel number list.

In another aspect of the present invention, a digital cable TV receiver includes a tuner configured to receive a cable signal including an emergency alert message, the emergency alert message including major and minor details channel numbers, a demodulator configured to demodulate the cable signal, and a controller which configures a first details channel number based on the major details channel number when the minor details channel number is set to a null value, and controls the tuner to tune to a channel frequency of a digital cable channel corresponding to the first details channel number when the first details channel number exists in a digital channel list.

In another aspect of the present invention, a data structure for an emergency alert message for use by a cable TV system includes a details major channel number field indicating a major channel number associated with a details channel, a details minor channel number field indicating a minor channel number associated with the details channel, and a details channel source field indicating whether the details channel is a digital channel or an analog channel.

In another aspect of the present invention, an emergency alert signaling method for use by a cable TV system includes (a) receiving an in-band cable signal including an emergency alert message, the emergency alert message including a details channel source field indicating whether a details channel is a digital channel or an analog channel, (b) configuring a details channel number based on major and minor details channel numbers included in the emergency alert message, (c) determining whether a details channel corresponding to the details channel number is a digital channel or an analog channel upon parsing the details channel source field, and (d) tuning to a channel frequency of one of a digital cable channel and an analog cable channel corresponding to the details channel number based upon a result of the determination in step (c).

In a further aspect of the present invention, a digital cable TV receiver includes a tuner configured to receive an in-band cable signal including an emergency alert message, the emergency alert message including major and minor details channel numbers, a demodulator configured to demodulate the in-band cable signal, and a controller which configures a details channel number based on the major and minor details channel numbers, and determines whether a details channel corresponding to the details channel number is a digital channel or an analog channel upon parsing a details channel resource field included in the emergency alert message, wherein the controller controls the tuner to tune to one of a digital cable channel and an analog cable channel corresponding to the details channel number based on a result of the determination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram of a syntax structure describing a processing protocol of an emergency alert message applied to a first embodiment of the present invention;

FIG. 4 is a diagram of a syntax structure describing a processing protocol of a modified emergency alert message applied to a second embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, the terms used in the present invention are mainly selected from currently usable global and general terms. Yet, most appropriate terms are arbitrarily used by the applicant to keep up with the appearance of new technologies. And, the meanings of the arbitrarily used terms will be clearly explained in the corresponding description. Hence, in apprehending the present invention, the present invention should be understood not by the simple names of the terms but by the meanings of the terms.

Generally, an emergency alert message can be transmitted via OOB or in-band. In this case, a cable-ready digital TV receives the emergency alert message transmitted via OOB if a POD module is loaded therein or the emergency alert message transmitted as an in-band signal if the POD module is not loaded therein. In case of receiving the emergency alert message transmitted as an in-band signal since the POD module is not loaded, the present invention is described by first and second embodiments for a method of determining whether a details channel included in the emergency alert message is an analog or digital channel.

In the first embodiment of the present invention, a method of determining whether a details channel to be tuned is an analog or digital channel accurately without modifying a previous emergency alert message processing protocol is proposed. As a cable broadcast receiver for performing a details channel processing method according to first and second embodiments of the present invention, any cable broadcast receiver capable of digital cable broadcasting and having an emergency alert message signaling function can be employed. For instance, there are an open-cable broadcast receiver, a cable-ready digital TV and the like.

Figure 1:
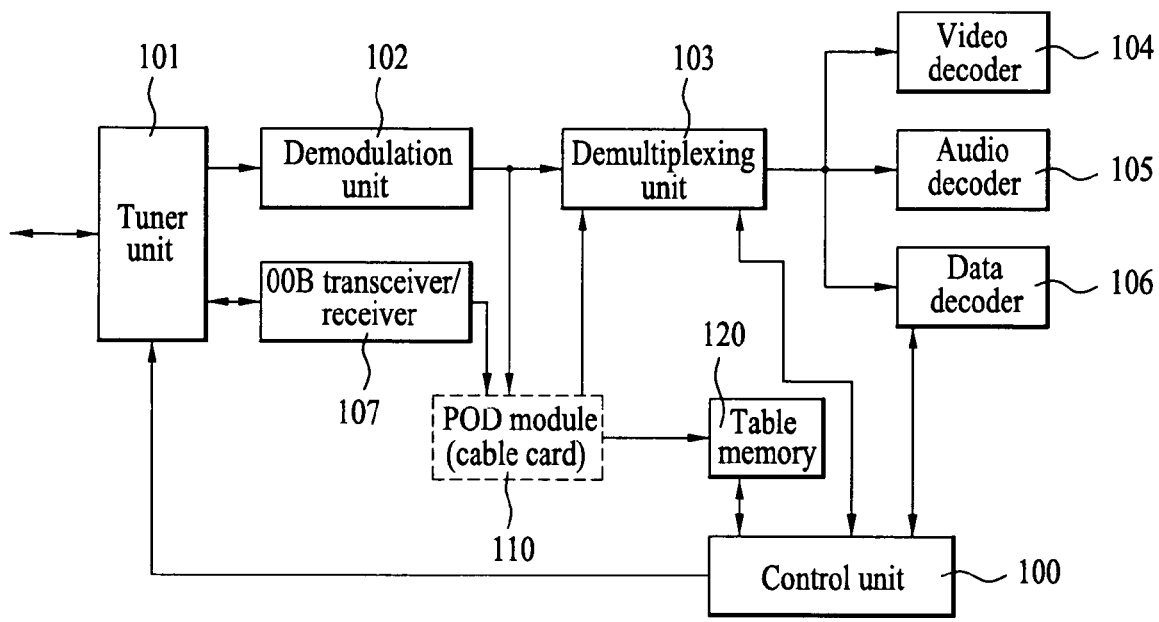
FIG. 1 is a block diagram of a digital cable broadcast receiver according to the present invention.

FIG. 1 is a block diagram of a digital cable broadcast receiver according to the present invention, in which a POD module 110 is indicated by a dotted line to mean the POD module 110 is detachably loaded in a slot of a body of the digital cable broadcast receiver (or cable-ready digital TV). If the POD module 110 is loaded in the slot of the body, an A/V broadcast program transmitted as an in-band signal is tuned and demodulated by a tuner unit 101 and a demodulation unit 102, respectively to be outputted to the POD module 110. And, information such as an emergency alert message, channel & program guide information and the like is outputted to the POD module 110 through the tuner unit 101 and an OOB transceiver unit 107. If the A/V broadcast signal demodulated by the demodulation unit 102 is scrambled, the POD module 110 descrambles the signal through subscriber confirmation and the like to output the descrambled signal to a demultiplexing unit 103. The POD module 110 parses data information and then stores a parsed result in a table memory 120.

A control unit 100 controls demultiplexing of the demodulated A/V broadcast signal using information stored in the table memory 120. And, the control unit 100 controls tuning to a user-selecting channel or a details channel received via OOB. In doing so, the A/V broadcast signal is time-demultiplexed by a transmitting side to be transmitted in a transport packet form. And, a PID (packet identifier) indicating whether the packet is a video or audio stream is provided to a header of each packet of the multiplexed A/V broadcast signal. The PID provides a means for demultiplexing the time-multiplexed signal. The demultiplexing unit 103 can identify whether a current packet is a video or audio signal using the PID. Hence, the demultiplexing unit 103 separates a video signal and an audio signal from the time-multiplexed A/V broadcast program signal outputted from the POD module 110 by a control of the control unit 100 and then outputs the separated signals to video and audio decoders 104 and 105, respectively.

The video decoder 104 decodes the compression coded video signal in a process reverse to that of coding to restore an original video signal, and the audio decoder 105 decodes the compression coded audio signal in a process reverse to that of coding to restore an original audio signal. For instance, the video decoder 104 is an MPEG-2 decoder and the audio decoder 105 is an AC-3 decoder. Meanwhile, if the POD module 110 in FIG. 1 is not loaded in the body slot, the A/V broadcast signal transmitted as an in-band signal is tuned and demodulated by the tuner unit 101 and the demodulation unit 102, respectively to be outputted to the POD module 110. And, data information transmitted as an in-band signal such as an emergency alert message, channel & program guide information and the like is outputted to the demultiplexing unit 103 through the tuner unit 101 and the demodulation unit 102.

In doing so, the A/V broadcast signal is multiplexed in the transmitting side to be transmitted in a transport packet form. And, the data information such as an emergency alert message, channel & program guide information and the like is multiplexed with the A/V broadcast signal to be transmitted in a transport packet form. Alternatively, the data information can be separately transport-packetized only to be transmitted. Hence, the demultiplexing unit 103 separates the video, audio and data signals from each other with reference to PIDs of the demodulated transport packets, respectively by a control of the control unit 100 and then outputs the signals to decoders 104, 105 and 106, respectively. The video decoder 104 decodes the compression coded video signal in a process reverse to that of coding to restore an original video signal, and the audio decoder 105 decodes the compression coded audio signal in a process reverse to that of coding to restore an original audio signal. Moreover, the data decoder 106 parses the data information and then stores a corresponding result in the table memory 120 via the control unit 100.

In this case, if the POD module 110 is not loaded in the slot of the body, the control unit 100 identifies whether the details channel included in the emergency alert message transmitted as an in-band signal is the digital or analog channel according to the application of the first or second embodiment of the present invention and then controls a switching to the identified channel.

First Embodiment

FIG. 2 is a diagram of a syntax structure describing a processing protocol of an emergency alert message applied to a first embodiment of the present invention, in which parts associated with a channel number of an emergency alert message are shown. An emergency alert message processing protocol cable_emergency_alert( ) in FIG. 2 is defined by an MPEG-2 table format to be compatible with an MPEG-2 transport. The table is divided into at least one section to be transmitted in a transport packet form. Hence, a digital cable broadcast receiver regards the table as a cable_emergency_alert( ) message if a table_ID field value is 0xD8.

In the emergency alert message processing protocol, an alert_priority field indicates a priority of alert. Namely, a signaling (or processing) of a received emergency alert message is decided (or determined) according to the alert_priority field value. In other words, decided are whether the emergency alert message is unconditionally ignored, whether the emergency alert message is ignored under a specific condition, whether a details channel included in the emergency alert message is forcibly tuned and the like.

A details_OOB_source_ID field is valid if the emergency alert message is transmitted via OOB and if a POD module is loaded. And, the details_OOB_source_ID field is a source ID of a virtual channel for the details channel to be tuned. The source ID refers to the virtual channel described in OOB SI. And, details_major_channel_number and details_minor_channel_number fields indicate major and minor channel numbers of the details channel, respectively to be taken into consideration if the emergency alert message is transmitted as an in-band signal and if the POD module is not loaded. If the details channel is an analog channel, the parsed details_minor_channel_number field has a null value (e.g., a value of 0). If the details channel is a digital channel and is represented by a one-part channel number, the details_minor_channel_number filed value may have a null value according to a one-part channel number value. An audio_OOB_source_ID field is valid if the emergency alert message is transmitted via OOB and if the POD module is loaded. The audio_OOB_source_ID field indicates a source ID of an audio-only virtual channel providing audio associated with an alert event.

Figure 3:
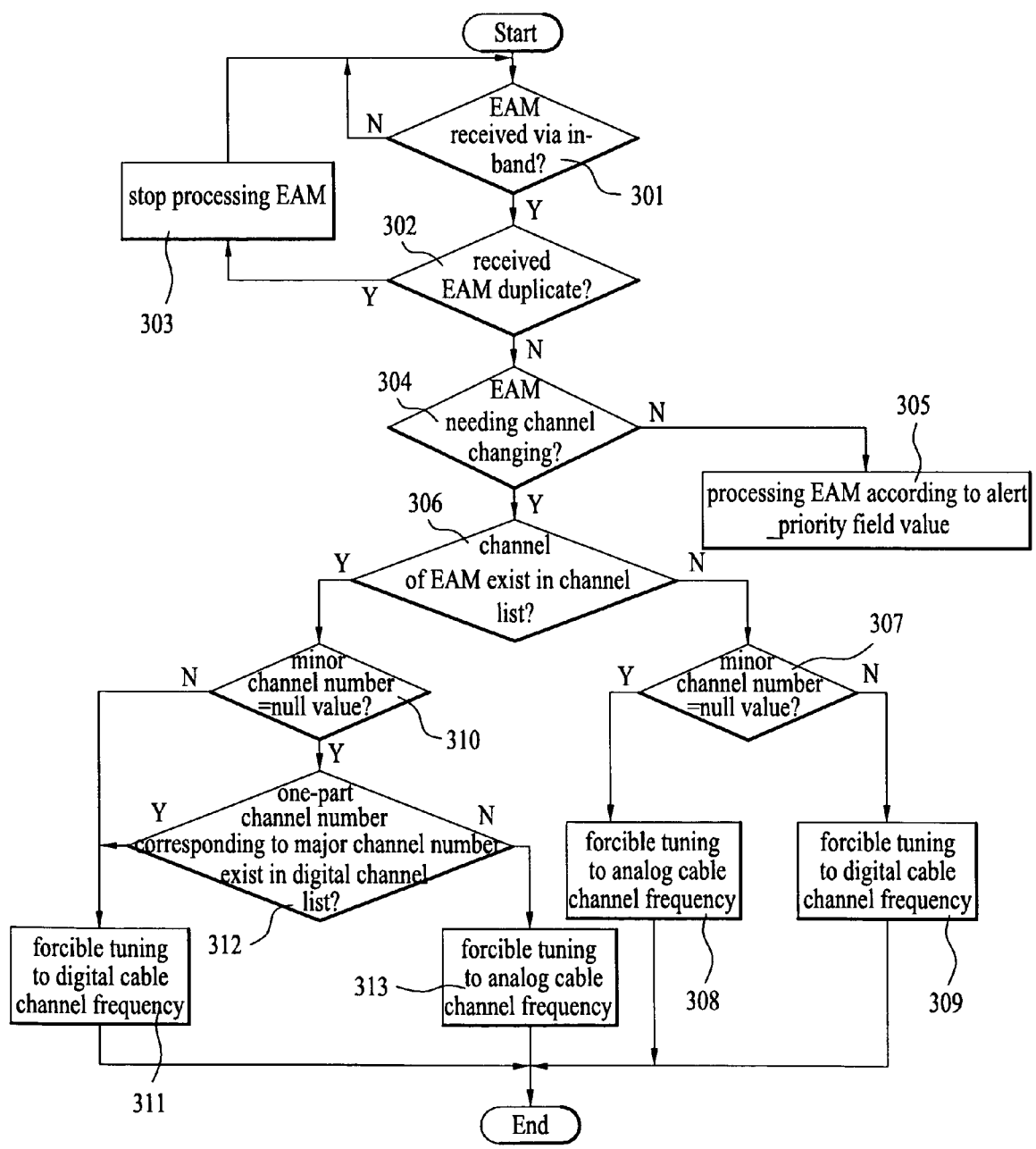
FIG. 3 is a flowchart of an emergency alert message channel signaling method according to a first embodiment of the present invention.

FIG. 3 is a flowchart of an emergency alert message channel signaling method according to a first embodiment of the present invention. The control unit 100 determines that an emergency alert message is received if there exists a table having a table ID of 0xD8 among PSIP information parsed by the data decoder 106. If the cable_emergency_alert( ) syntax, as shown in FIG. 2, configuring the table, it is able to detect necessary information such as a sequence_number field value, an alert_priority field value, a details_major_channel_number, a details_minor_channel_number field value and the like. In this case, a value resulting from parsing the details_major_channel_number and details_minor_channel_number fields is a details channel.

First of all, if an emergency alert message transmitted as an in-band signal is received since the POD module is not loaded in the body (Step 301), it is determined whether the received emergency alert message is overlapped with a previously received emergency alert message (step 302). Namely, if the emergency alert message is received, it is determined whether a band of receiving the emergency alert message is different from that of receiving the previously received emergency alert message. If the bands are different from each other, a duplicate test of the emergency alert message is avoided by clearing sequence_number. If the two bands are like, it is determined whether the currently received emergency alert message is identical to the previously received emergency alert message.

Since the present invention explains the case of receiving the emergency alert message transmitted as an in-band signal, Step 302 confirms whether the emergency alert message was previously received as an in-band signal. If it is confirmed that the emergency alert message was previously received as an in-band signal, it is determined whether contents of the previously and currently received emergency alert messages are overlapped with each other. If the currently and previously received emergency alert messages are duplicate, the processing of the currently received emergency alert message is stopped (step 303). Namely, the received emergency alert message is discarded instead of being processed.

Meanwhile, if it is determined by Step 302 that the currently received emergency alert message is not overlapped with the previously received emergency alert message, it is determined whether the emergency alert message needs a forcible switching to the details channel (S304). This can be done by referring to the alert_priority field value. If it is decided in Step 304 that the emergency alert message does not need the forcible switching to the details channel, the received emergency alert message is processed according to the alert_priority field value (Step 305). For instance, if the alert_priority field value is 7 and if a user is currently viewing a pay-per-view, the emergency alert message is discarded instead of being processed.

If it is decided in Step 304 that the emergency alert message needs the forcible switching to the details channel, it is checked whether the details channel included in the emergency alert message exists in the channel list (Step 306). The details channel can be obtained by parsing the details_major_channel_number and details_minor_channel_number fields. In case of cable broadcasting, a list of viewable digital channels is created if system power is turned on or if a user request is made. In this case, the method of creating the list of viewable channels differs according to a presence or non-presence of loading the POD module. Namely, since SI includes information on viewable digital channels therein to be transmitted, if the POD module is loaded, the list of viewable digital channels is created by parsing the SI in the POD module 110. If the POD module is not loaded, it is unable to parse the SI. Hence, the list of viewable digital channels is created via channel scan. In this case, a digital channel list and an analog channel list are generated to be identified from each other. And, the digital and analog channel lists are collectively called a channel list.

If the details channel does not exist in the above-generated channel list, it is checked whether a minor channel number is set to a null value (Step 307). If the details channel does not exist in the channel list in Step 307 and if it is decided that the minor channel number is not set to the null value, it is decided as the digital channel. And, by controlling the tuner unit 101, forcible tuning to a physical channel frequency of a cable digital channel corresponding to a major-minor channel number is performed (Step 309). If the details channel does not exist in the channel list in Step 307 and if it is decided that the minor channel number is set to the null value, it is decided as the analog channel. And, by controlling the tuner unit 101, forcible tuning to a physical channel frequency of a cable analog channel corresponding to a major channel number is performed (Step 308).

Namely, if the minor channel number is set to the null value, it means the analog channel or the digital channel represented by one-part. As a frequency of the analog channel is decided, tuning is possible without the channel list. Yet, the one-part represented digital channel, which has a complicated process of deciding a physical channel frequency to be substantially tuned, should exist in the channel list to enable tuning. So, in the present invention, the forcible tuning to the analog channel frequency is performed if the details channel does not exist in the channel list and if the minor channel number is set to a null value.

Meanwhile, if it is decided in Step 306 that the details channel exists in the channel list, it is determined whether the minor channel number is set to a null value (Step 310). If it is decided in Step 310 that the minor channel number is not set to the null value under the condition that the details channel exists in the channel list, it is the digital channel. Hence, by controlling the tuner unit 101, forcible tuning to a physical channel frequency of a digital cable channel corresponding to the details channel obtained from parsing the major and the minor channel fields is performed (Step 311). If it is decided in Step 310 that the minor channel number is set to the null value under the condition that the details channel exists in the channel list, it should be identified whether it is the analog channel or the digital channel represented by one-part. Namely, if the details channel number exists in the analog or digital channel list only, there occurs no problem. Yet, if the details channel number exists in both of the analog and digital channel exists, the above problem occurs. Hence, it should be determined whether it is the analog or digital channel.

A digital channel number transmitted as an in-band signal is generally represented not by the minor channel number set to a null value but by two-part. Yet, the fact that the minor channel number of the digital channel number transmitted as an in-band signal is represented by one-part of a null value means that the broadcasting corresponding to the digital channel number is important. Hence, in the present invention, if the details channel number having the minor channel number set to a null value simultaneously exists in both the analog and digital lists, a priority is given to the digital channel to determine the details channel as the digital channel.

For this, if it is decided in Step 310 that the minor channel number is set to a null value, it is determined whether the details channel (i.e., major channel number) represented by one-part exists in the digital channel list (Step 312). If the details channel represented by one-part exists in the digital channel list in Step 312, a currently viewed channel is forcibly switched to the physical channel frequency of the digital cable channel corresponding to the details channel by controlling the tuner unit 101 (Step 311). If it is decided in Step 312 that the details channel represented by one-part does not exist in the digital channel list, it means a case that the major channel number of the details channel exists in the analog channel list only. Hence, the currently viewed channel is forcibly switched to the physical channel frequency of the analog cable channel corresponding to the details channel by controlling the tuner unit 101 (Step 313).

Thus, in the first embodiment of the present invention, if the POD module is not loaded, the emergency alert message cable_emergency_alert( ) transmitted as an in-band signal is received to be parsed. In this case, if the details channel number configured with the minor channel number set to a null value and the corresponding major channel number within the cable_emergency_alert( ) syntax exists in the digital channel list, forcible tuning to the digital cable channel is performed. Meanwhile, if the details channel number configured with the minor channel number set to a null value and the corresponding major channel number within the cable_emergency_alert( ) syntax does not exist in the digital channel list, forcible tuning to the analog cable channel is performed regardless of an existence or non-existence of the details channel number in the analog channel list.

Second Embodiment

In a second embodiment of the present invention, a field for clearly defining whether a broadcast channel of an emergency alert message is an analog or digital channel in case of an in-band emergency alert system (EAS) is added to the cable_emergency_alert( ) syntax as the emergency alert message processing protocol in FIG. 2. Hence, in case of receiving an emergency alert message transmitted as an in-band signal since the POD module is not loaded, it is facilitated to determine whether a channel of the emergency alert message corresponds to an analog or digital channel.

FIG. 4 is a diagram of a syntax structure describing a processing protocol of a modified emergency alert message applied to a second embodiment of the present invention, in which parts associated with channel information of an emergency alert message are shown. Referring to FIG. 4, a channel source field, details_channel_source is allocated to one of reserved fields within a cable_emergency_alert( ) syntax to express a channel species. Namely, the details_channel_source field indicates whether a broadcast channel for an emergency alert message transmitted as an in-band signal is a digital or analog channel.

In the cable_emergency_alert( ) syntax in FIG. 2, 6-bit reserved fields exist between details_OOB_source_ID and details_major_channel_number fields. In second embodiment of the present invention, two bits of the six are allocated to the details_channel_source field and identification information capable of identifying whether a details channel is a digital or analog channel is written in the details_channel_source field. Table 1 shows species of the details channel according to the details_channel_source field value.

TABLE 1

| Value | Meaning |
| --- | --- |
| 0x00(00) | [Reserved for future use] |
| 0x01(01) | Analog channel |
| 0x02(10) | Digital channel |
| 0x03(11) | [Reserved for future use] |

In Table 1, if the details_channel_source field value is '00' or '11', it is defined as reserved. If the details_channel_source field value is '01', it is defined as an analog channel. And, if the details_channel_source field value is '10', it is defined as a digital analog channel. If so, the details_channel_source field value facilitates the details channel to be identified as the analog or digital channel even if a minor channel number set to a null value.

In this case, the definition of the details_channel_source field value is just exemplary. Namely, the analog channel can be defined by another value instead of '01' according to a designer's choice. And, the digital channel can be defined by another value instead of '10' as well. In the present invention, two bits of the reserved bits between the details_OOB_source_ID and details_major_channel_number fields are allocated as the details_channel_source field. Alternatively, one bit, three bits or six bits can be allocated as the details_channel_source field.

Alternatively, another reserved field not between the details_OOB_source_ID and details_major_channel_number fields within the cable_emergency_alert( ) syntax can be allocated as the details_channel_source field. Thus, the reserved field used as the details_channel_source field and the channel species defined in the details_channel_source field can be facilitated to be effectively modified by those skilled in the art. Hence, the present invention is not limited the above description that is just exemplary.

In the present invention, the reserved field within the cable_emergency_alert( ) syntax is allocated as the details_channel_source field and the information that can identify whether the details channel transmitted as an in-band signal is the digital or analog channel is written in the details_channel_source field. The cable_emergency_alert( ) syntax in FIG. 4 is defined by an MPEG-2 table format to be compatible with an MPEG-2 transport. The table is divided into at least one section to be transmitted in a transport packet form. Hence, a digital cable broadcast receiver regards the table as a cable_emergency_alert( ) message, if a table_ID field value is 0xD8, and then performs the corresponding operations. The alert_priority, details_OOB_source_ID, details_major_channel_number, details_minor _channel_number and audio_OOB_source _ID fields are described in detail of the cable_emergency_alert( ) syntax structure in FIG. 2, which is skipped in the following.

Figure 5:
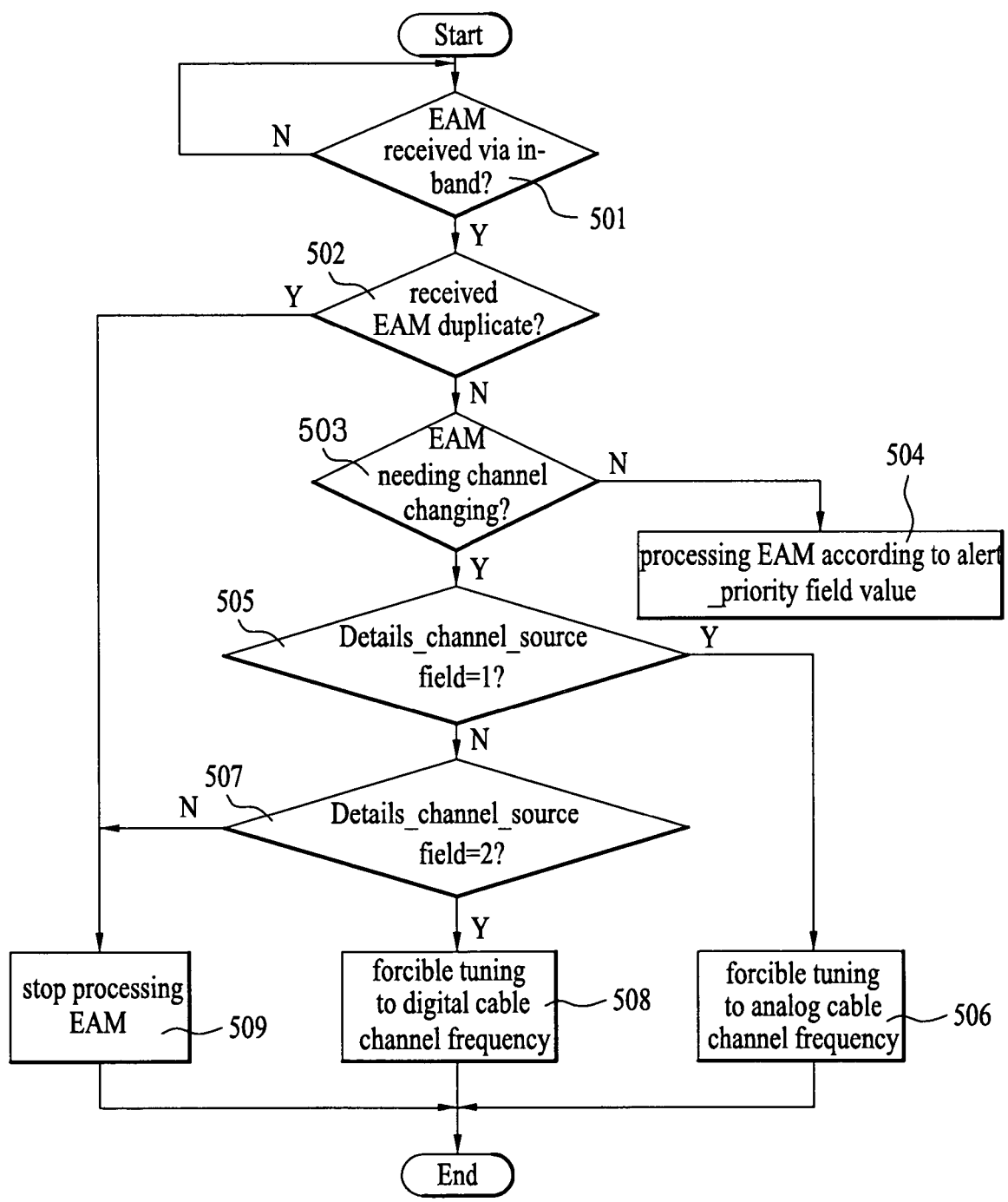
FIG. 5 is a flowchart of an emergency alert message channel signaling method according to a second embodiment of the present invention.

FIG. 5 is a flowchart of a method of signaling an emergency alert message transmitted as an in-band signal with the modified cable_emergency_alert( ) syntax structure in FIG. 4 according to a second embodiment of the present invention. The control unit 100 determines that an emergency alert message is received if there exists a table having a table ID of 0xD8 among PSIP information parsed by the data decoder 106. Subsequently, the control unit 100 processes (or signals) the emergency alert message by parsing the cable_emergency_alert( ) syntax configuring the table.

A details channel number can be found by parsing details_major_channel_number and details_minor_channel_number fields within the cable_emergency_alert( ) syntax. By parsing a details_channel_source field within the cable_emergency_alert( ) syntax, it is able to determine whether the details channel is a digital or analog channel. Namely, if an emergency alert message transmitted as an in-band signal is received since the POD module is not loaded in the body (Step 501), it is determined whether the received emergency alert message is overlapped with a previously received emergency alert message (step 502). If the received emergency alert message is overlapped with the previously received emergency alert message in Step 502, the currently received emergency alert message is discarded instead of being processed (Step 509). If the received emergency alert message is not overlapped with the previously received emergency alert message, it is determined whether it is the emergency alert message needing forcible switching to the details channel (Step 503).

The method of deciding whether the emergency alert message is overlapped in Step 502 and whether it is the emergency alert message needing the channel switching is identical to that of the first embodiment of the present invention, of which explanation is skipped in the following. Meanwhile, if it is decided in Step 503 that it is the emergency alert message that does not need the channel switching, the received emergency alert message is processed according to an alert_priority field value (Step 504). If it is decided in Step 503 that it is the emergency alert message that needs the forcible switching to the details channel, it is determined whether the details_channel_source field value within the cable_emergency_alert( ) syntax is 1 (Step 505).

If the details_channel_source field value is 1 in Step 505, it is determined as the analog channel according to the definition in Table 1. And, by controlling the tuner unit 101, forcible tuning to a physical channel frequency of an analog cable channel corresponding to a details channel having a major channel number details_major_channel_number is carried out (Step 506). If the details_channel_source field value is not 1 (=01) in Step 505, it is determined whether the details_channel_source field value is 2 (=10) (Step 507).

If the details_channel_source field value is 2 in Step 507, it is determined as the digital channel according to the definition in Table 1. And, by controlling the tuner unit 101, forcible tuning to a physical channel frequency of a digital cable channel corresponding to a details channel obtained from parsing a major channel number field (details_major_channel_number) and a minor channel number field (details_minor_channel_number) (Step 508). In this case, if the minor channel number is set to a null value, it is the digital channel represented by one-part. If the minor channel number is not set to a null value, it is the digital channel represented by two-part. And, if it is determined that the details_channel_source field value is not 1 and not 2, it means there occurs an error. Hence, the processing of the emergency alert message is stopped (Step 509).

Accordingly, the present invention provides the following effects or advantages. First of all, in case of receiving the emergency alert message transmitted as an in-band signal, by clearly determining whether the details channel included in the emergency alert message corresponds to the analog or digital channel even if the minor channel number is set to a null value, a currently viewed channel can be tuned to the details channel forcibly and precisely.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An emergency alert signaling method for use by a cable TV system, the method comprising the steps of:
    (a) determining whether a minor details channel number included in an emergency alert message is set to a null value, the emergency alert message being included in a cable signal and a minor details channel number defining a service within a group of services defined by a major details channel number in a two-part channel number;
    (b) configuring a first details channel number based on a major details channel number included in the emergency alert message when the minor details channel number is set to the null value;
    (c) determining whether the first details channel number exists in a digital channel number list including channel numbers of a list of viewable digital channels; and
    (d) tuning to a channel frequency of a digital cable channel corresponding to the first details channel number when the first details channel number exists in the digital channel number list.

2. The method of claim 1, wherein the cable signal is an in-band signal.

3. The method of claim 1, further comprising the steps of:
    (e) configuring a second details channel number based on the major and minor details channel numbers when the minor details channel number is not set to the null value; and
    (f) tuning to a channel frequency of a second digital cable channel corresponding to the second details channel number.

4. The method of claim 1, further comprising the step of (e) tuning to a channel frequency of an analog cable channel corresponding to the first details channel number when the first details channel number does not exist in the digital channel number list.

5. The method of claim 1, further comprising the steps of:
    (e) determining whether the emergency alert message is identical to a previous emergency alert message included in a previous cable signal; and
    (f) determining whether an alert priority included in the emergency alert message requires the cable TV system to tune to a details channel when the emergency alert message is not identical to the previous emergency alert message.

6. The method of claim 5, wherein the step (e) comprises the steps of
    (g) determining whether the previous cable signal is an in-band signal; and
    (h) determining whether the emergency alert message is identical to the previous emergency alert message only when the previous cable signal is an in-band signal.

7. The emergency alert signaling method of claim 1, wherein the null value is 0.

8. A digital cable TV receiver comprising:
    a tuner configured to receive a cable signal including an emergency alert message, the emergency alert message including major and minor details channel numbers and the minor details channel number defining a service within a group of services defined by the major details channel number in a two-part channel number;
    a demodulator configured to demodulate the cable signal; and
    a controller which configures a first details channel number based on the major details channel number when the minor details channel number is set to a null value, and controls the tuner to tune to a channel frequency of a digital cable channel corresponding to the first details channel number when the first details channel number exists in a digital channel list.

9. The digital cable TV receiver of claim 8, wherein the controller configures a second details channel number based on the major and minor details channel numbers when the minor details channel number is not set to the null value, and controls the tuner to tune to a channel frequency of a second digital cable channel corresponding to the second details channel number.

10. The digital cable TV receiver of claim 8, wherein the controller controls the tuner to tune to a channel frequency of an analog cable channel corresponding to the first details channel number when the first details channel number does not exist in the digital channel number list.

11. The digital cable TV receiver of claim 8, wherein the null value is 0.

* * * * *